United States Patent
Webb et al.

(10) Patent No.: US 8,878,088 B2
(45) Date of Patent: Nov. 4, 2014

(54) MODULAR MOC DRIVER AND INTERLOCK ASSEMBLY FOR CIRCUIT BREAKER

(75) Inventors: John C. Webb, Florence, SC (US);
Michael J. Murray, Durham, NC (US);
Patrick J. Logan, Tipp City, OH (US)

(73) Assignee: ABB Technology AG, Zurich (CH)

( * ) Notice: Subject to any disclaimer, the term of this patent is extended or adjusted under 35 U.S.C. 154(b) by 386 days.

(21) Appl. No.: 13/423,301

(22) Filed: Mar. 19, 2012

(65) Prior Publication Data

US 2012/0241296 A1    Sep. 27, 2012

Related U.S. Application Data

(60) Provisional application No. 61/467,403, filed on Mar. 25, 2011.

(51) Int. Cl.
| | |
|---|---|
| *H01H 25/00* | (2006.01) |
| *H02B 11/10* | (2006.01) |
| *H01H 3/32* | (2006.01) |
| *H01H 9/00* | (2006.01) |
| *H02B 11/12* | (2006.01) |
| *H02B 11/133* | (2006.01) |

(52) U.S. Cl.
CPC ............... *H02B 11/10* (2013.01); *H01H 3/32* (2013.01); *H01H 9/0066* (2013.01); *H02B 11/12* (2013.01); *H02B 11/133* (2013.01)
USPC ....................................................... 200/337

(58) Field of Classification Search
CPC .......... H02B 13/00; H02B 71/52; H02B 3/30; H02B 25/00; H02B 9/00
USPC ............ 200/49, 5 R, 5 A, 16 C, 19.18, 50.01, 200/19.22, 37 R, 48 R, 50.21, 50.23, 50.26, 200/50.24, 51 R
See application file for complete search history.

(56) References Cited

U.S. PATENT DOCUMENTS

| | | | |
|---|---|---|---|
| 4,176,262 A | 11/1979 | McMillen | |
| 5,286,936 A * | 2/1994 | Hatekeyama | 200/400 |
| 5,304,755 A | 4/1994 | Romano | |
| 5,856,643 A | 1/1999 | Gress, Jr. et al. | |
| 8,237,070 B2 * | 8/2012 | Zhang | 200/50.32 |
| 2004/0020753 A1 * | 2/2004 | Liebetruth | 200/50.21 |

FOREIGN PATENT DOCUMENTS

KR    20100095747 A    9/2010

OTHER PUBLICATIONS

International Search Report and Written Opinion in PCT/US12/029596 dated Jul. 17, 2012.

* cited by examiner

*Primary Examiner* — Renee Luebke
*Assistant Examiner* — Anthony R. Jimenez
(74) *Attorney, Agent, or Firm* — Manelli Selter PLLC; Edward J. Stemberger

(57) ABSTRACT

A MOC operator structure for a vacuum circuit breaker includes a cam coupled to an operating shaft of the circuit breaker, a follower in engagement with the cam, a first lever coupled with the follower, free-floating spring structure associated with the first lever, a second lever, a linkage structure coupled with the second lever and constructed and arranged to be associated with a breaker-panel interface for moving auxiliary switches, and movable cable structure operatively coupled between the first and second levers. The first lever and spring structure are configured such that when the contacts are closed, movement of the cam via the operating shaft drives the first lever to a maximum position compressing the spring structure, prior to any movement of the cable structure, and wherein force of the spring structure moves the cable structure and thus the second lever, causing movement of the linkage structure.

17 Claims, 5 Drawing Sheets

MODULAR MOC DRIVER AND INTERLOCK ASSEMBLY FOR CIRCUIT BREAKER

BACKGROUND OF THE INVENTION

The present invention relates to electrical switchgear and, more particularly, to a mechanism operated cell (MOC) switch operator for a vacuum operated circuit breaker.

A well known limitation of roll-in-replacement (RiR) circuit breakers, which replace legacy air magnetic circuit breakers, is that the mechanism travel of the vacuum breaker is much shorter and the velocity (relative to the distance travel) is much higher than the breakers which they are replacing. Additionally, the excess energy available for driving these panel mounted external switches is less in the more modern circuit breakers.

A mechanism-operated cell (MOC) switch is typically located in a switchgear cell and is operated by a circuit breaker MOC operator mechanism. A typical example may be found in U.S. Pat. No. 4,176,262, the content of which is hereby incorporated by reference into this specification. The MOC switch is employed to provide extra or redundant contacts for circuit breaker status and status control.

When applying modern technology circuit breaker elements, as retrofit or replacement RiR circuit breakers, for the older technology circuit breakers, worn MOC assemblies may possibly create problems. For example, the velocity of the new mechanism is much faster; the travel motion of the driver must be multiplied in driving the panel mounted component; the available energy in the circuit breaker is lower; and because in a retrofit situation, the panel equipment is typically 30 or more years of age so an optimal configuration must allow for age and potentially poor maintenance of the installed equipment resulting in increased friction and reduced tolerance for sudden accelerations.

Thus, there is a need to provide an improved MOC operator structure for a switchgear assembly that slows down motion of the mechanism and ensures that energy of operating the MOC does not interfere with the basic circuit breaker closing.

SUMMARY OF THE INVENTION

An objective of the present invention is to fulfill the need referred to above. In accordance with the principles of the invention, this objective is obtained by providing a mechanism-operated cell (MOC) operator structure for a vacuum circuit breaker. The circuit breaker includes an operating shaft coupled to an operating mechanism that closes contacts of the circuit breaker. The MOC operator structure includes a cam constructed and arranged to be coupled to the operating shaft of the circuit breaker, a follower in engagement with the cam, a first lever coupled with the follower, and a free-floating spring structure associated with the first lever. A second lever is provided. Linkage structure is coupled with the second lever and is constructed and arranged to be associated with a breaker-panel interface for moving auxiliary switches. Movable cable structure is operatively coupled between the first and second levers. The first lever and spring structure are constructed and arranged such that when the contacts are closed, movement of the cam via the operating shaft drives the first lever to a maximum position compressing the spring structure, and due to the friction and inertia of system driven by the second lever, full motion of the cam and first lever is accomplished prior to any movement of the cable structure, and wherein force of the spring structure moves the cable structure and thus the second lever, causing movement of the linkage structure.

In accordance with another aspect of the invention, a method is provided for moving a breaker panel interface structure of a vacuum circuit breaker. The circuit breaker including an operating shaft coupled to an operating mechanism that closes contacts of the circuit breaker. The method provides a mechanism-operated cell (MOC) operator structure having a cam coupled to the operating shaft of the circuit breaker, a follower in engagement with the cam, a first lever coupled with the follower, a free-floating spring structure associated with the first lever, a second lever, linkage structure coupled with the second lever and associated with the breaker-panel interface for moving auxiliary switches, and a link coupling the first lever to the second lever such that movement of the first lever moves the second lever. The method ensures that the first lever and spring structure are constructed and arranged such that when the contacts are closed, movement of the cam via the operating shaft drives the first lever to a maximum position compressing the spring structure, prior to any movement of second lever. The method also ensures that force of the spring structure acts on the link to cause movement of the second lever, thereby causing movement of the linkage structure for moving the auxiliary switches.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
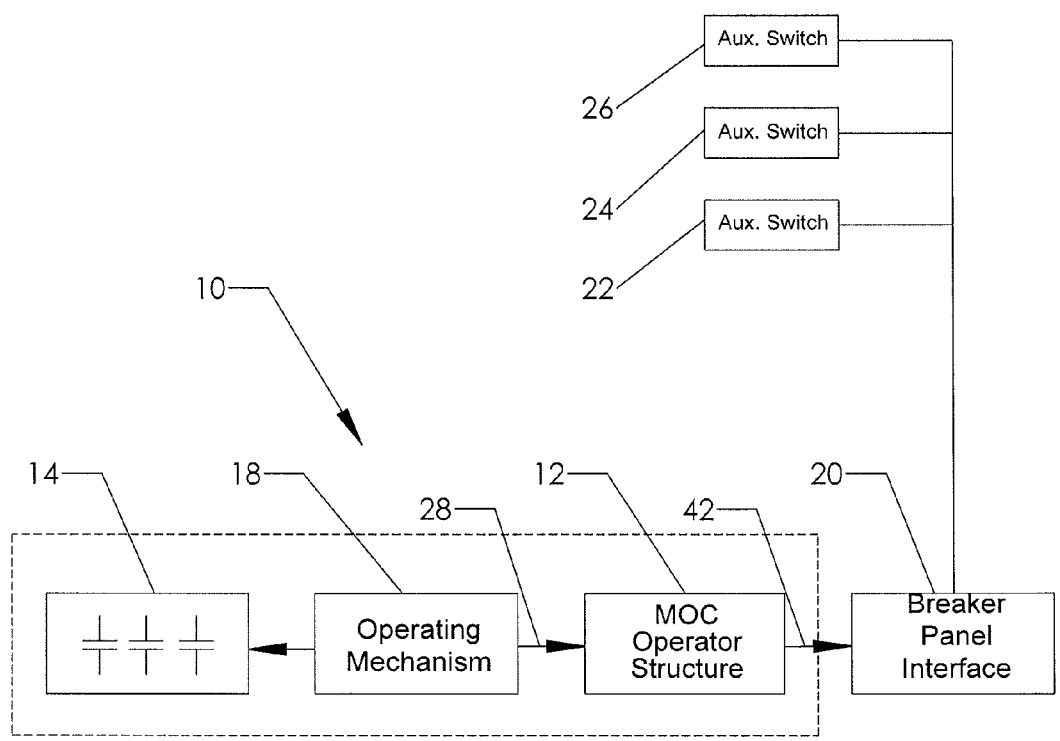
FIG. 1 is a block diagram of a vacuum circuit breaker having a MOC operator structure provided in accordance with an embodiment.

FIG. 1 illustrates a vacuum circuit breaker (VCB), generally indicated at 10, having a mechanism-operated cell (MOC) operator structure 12. The VCB 10 includes separable contacts 14 having an open position and a closed position in the conventional manner. An operating mechanism 18 is provided for moving the separable contacts 14 between the open and closed positions, and for moving the MOC operator structure 12. The MOC operator structure 12 is associated with a breaker panel interface structure 20 for moving one or more auxiliary switches (AS) 22, 24, and 26. Thus, when the operating mechanism 18 moves the separable contacts 14 to the closed position, the MOC operator structure 12 moves the breaker-panel interface structure 20 to a first position, which causes the auxiliary switches 22, 24, 26 to move to a closed position. When the operating mechanism 18 moves the separable contacts 14 to the open position, the MOC operator structure 12 moves the breaker-panel interface structure 20 to a second position, which causes the auxiliary switches 22, 24, 26 to move to an open position. Such movements will be explained more fully below.

Figure 2:
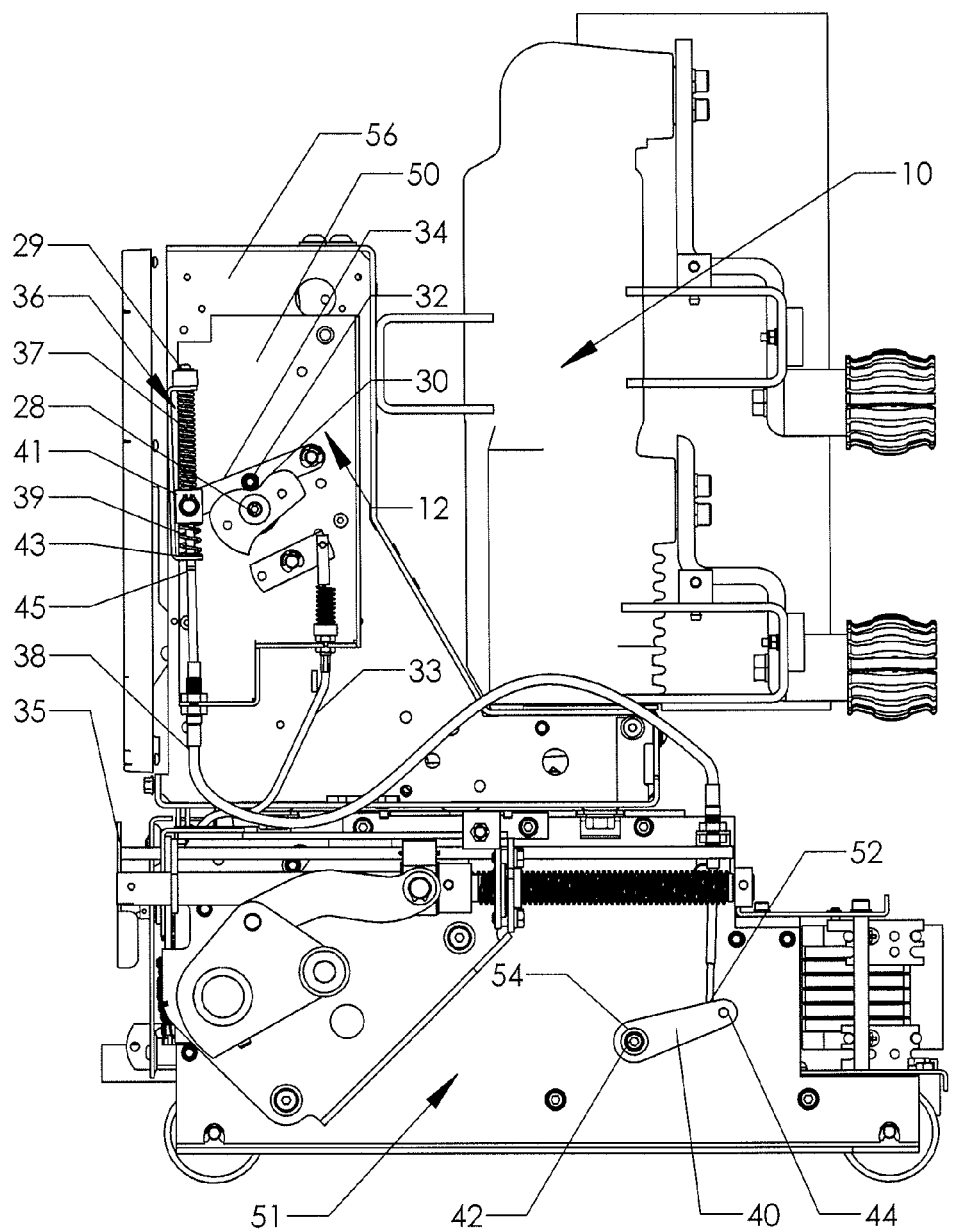
FIG. 2 is a side view of a vacuum circuit breaker having a MOC operator structure provided in accordance with an embodiment.
Figure 3:
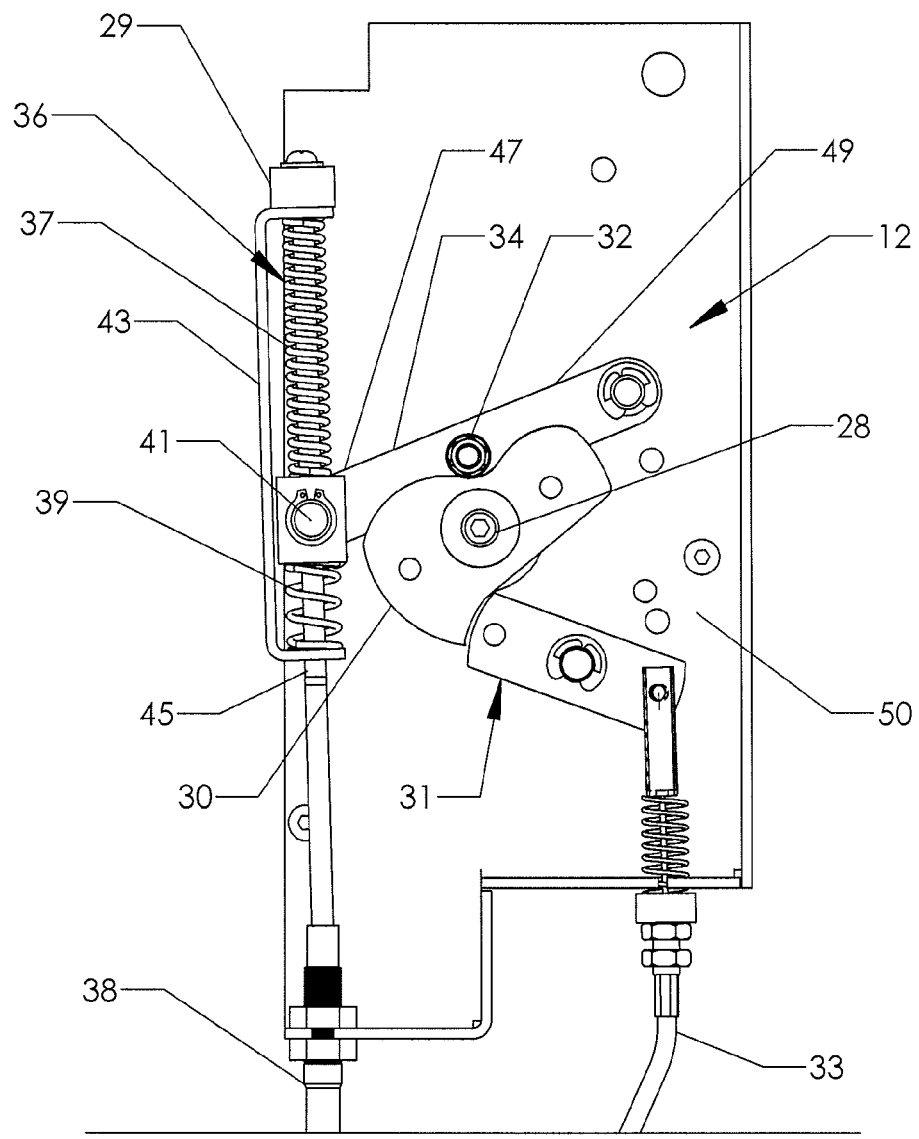
FIG. 3 is an enlarged view of the MOC operator structure of FIG. 2 shown in an open position.
Figure 4:
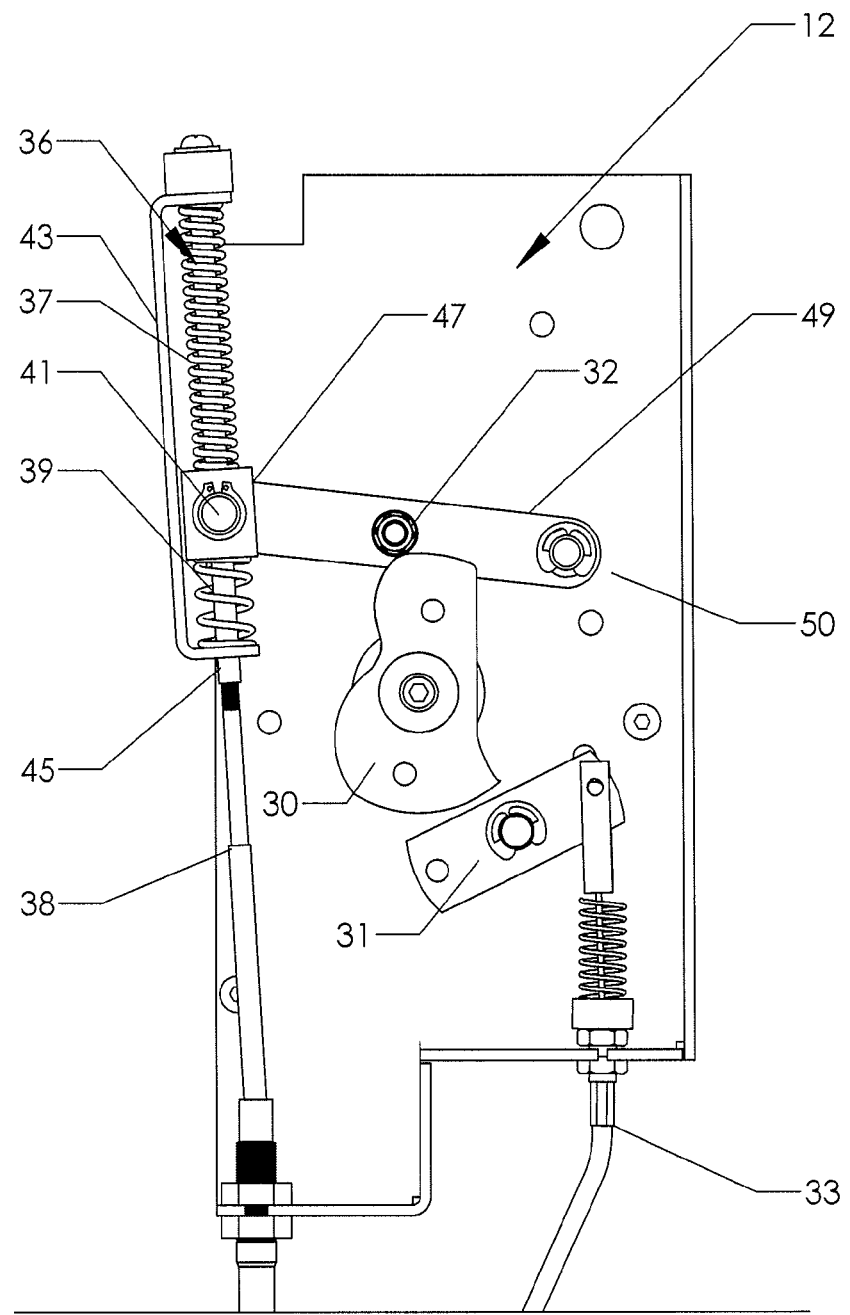
FIG. 4 is an enlarged view of the MOC operator structure of FIG. 2 shown in an closed position.

An example of the vacuum circuit breaker 10 is a type VD4 vacuum circuit breaker manufactured by ABB. Referring to FIG. 1, the VCB 10 has an operating shaft 28 coupled with the operating mechanism 18, which can be conventional push rods (not shown) for each of the exemplary three phases of VCB 10. As shown in FIG. 2, the shaft 28 is also coupled with a cam 30 of the MOC operator structure 12. The cam 30 as a prime mover is attached externally of the circuit breaker 10 to provide an optimum acceleration curve for the motion of the circuit breaker 10. The cam 30, upon movement with respect to follower 32 that is coupled with the lever, drives a first lever 34 that works against a free-floating spring structure, generally indicated at 36. The spring structure 36 is constructed and arranged to have a high initial (and final) load, but a moderate spring rate. As best shown in FIGS. 3 and 4, the spring structure 36 preferably includes a long compression spring 37 having a certain spring rage and a shorter compression spring 39 having a spring rate greater than the certain spring rate of the spring 37. A pivot block 41 is provided between the springs 37 and 39. A bracket 43 houses the springs 37 and 39 which surround a rod 45. An end of the rod 45 is coupled to the bracket 43 via a fastener 29. An end 47 of the lever 34 is coupled to the pivot block 41. The other end 49 of lever is pivotally coupled with respect to the housing 50. Housing 50 is coupled to wall 56 of the circuit breaker 10.

Another end of the rod 45 is coupled with a flexible cable structure 38 that acts a link to transmit the motion of the lever 34/spring structure 36 to a second lever 40 that is coupled with a rotatable shaft 42. Shaft 42 is associated with the breaker-panel interface 20 (FIG. 1). The rod 45 can be considered to be part of the cable structure 36. The lever 44 and shaft 42 are part of the lower breaker assembly, generally indicated at 51. More particularly, an end 52 of the cable structure 38 is fixed to an end 44 of the second lever 40. Another end 54 of the second lever 40 is coupled to the shaft 42.

The flexible cable structure 38 can be a conventional Bowden cable and allows for maximum adaptability between RiR configurations and minimizes lost motion which could occur if complex hard linkages were used. The cam 30 and spring structure 36 are constructed and arranged such that during the very rapid closing of the contacts 14 (FIG. 1) of the circuit breaker 10, the cam 30 fully rotates from an open position (FIG. 3) to a closed position (FIG. 4) and the driven first lever 34 reaches its maximum travel (thereby fully charging the spring structure 36 via pivot block 41) before any motion occurs in the driven cable structure 38 and breaker-panel interface structure 20. By controlling the initial load of the spring structure 36 and the effective spring rate thereof, it is possible to precisely control the maximum total energy that may be extracted from the circuit breaker 10 in order to ensure that there is no adverse affect the breaker's performance. By using the shorter, high rate spring 39, the longer, lower rate spring 37 can be pre-loaded to provide for a reasonable initial force (and final force), but still have a low enough spring rate for the spring 37 to extend the available motion of the output cable 38 while keeping the force and energy extracted low.

As an additional feature, due to the configuration of the prime mover cam 30, regardless of the load on the balance of the assembly, it is possible to ensure that there is no back pressure on the circuit breaker operating mechanism 18 attempting to open or unlatch the operating mechanism 18 inhibiting the proper operation of the contacts 14.

Once the contacts 14 of the circuit breaker 10 are closed, the required energy for operating the MOC operator structure 12 is now stored in the spring structure 36. In the embodiment, the spring structure 36 is pre-compressed for an initial load of 90 N and during the closing motion further compressed approx 50 mm at a rate of 5 N/mm for a total energy of about 10 Joules and a fully loaded force of about 350 N. This rather moderate 350 N spring force is the only force that acts on and moves the cable structure 38 to move the breaker-panel interface structure 20 and the rest of the panel mounted MOC operator structure 12, as explained more fully below. The balance of forces and the inertia of the system results in a moderate acceleration of the cell side components and a speed that approximates that of the original system when driven by an air-magnetic breaker.

During an opening operation as shown in FIG. 3, the cam 30 simply falls away from the first lever 34 and the rest of the system returns to its natural 'open' position based on return springs that are incorporated in the MOC operator structure 12. A small return spring is preferably incorporated into the breaker panel interface structure 20 to facilitate this motion when the breaker is operated outside of its panel.

Figure 5:
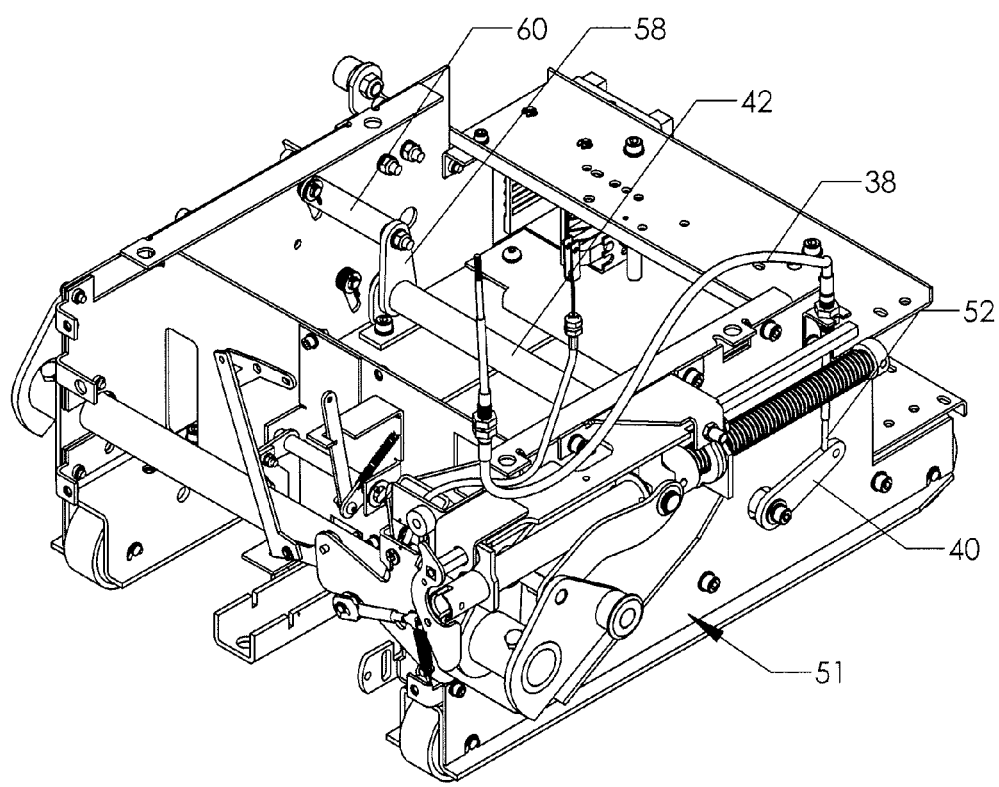
FIG. 5 is right side view of a lower breaker assembly of the vacuum circuit breaker of FIG. 2.

With reference to FIG. 5, the cable 38 is coupled to the second lever 40 which is coupled to a linkage structure including the shaft 42, a first link 58 fixed to the shaft 42, and a second link is pivotally coupled with the first link to define a toggle link structure, with an internal angle there-between of approx 120 degrees. The first link 58 is driven by the cable 38, lever 40 and shaft 42 to be generally vertical, with the second link 60 driving the breaker-panel interface structure 20. This straightening motion provides three advantages: (1) by varying the length and initial angle of the links 58, 60, a constant 50 mm motion of the cam 30 and lever 34 assembly can be translated into whatever length of travel is required to operate the panel mounted auxiliary switches 22, 24, 26; (2) the straightening of the two links 58, 60 provides for a natural slowing of the velocity of the moving end in an inverse cosine shaped velocity profile; (3) and as the mechanism reaches it's final, nearly straight position, the mechanical advantage of the vertical force (applied to the panel mounted auxiliary switches 22, 24, 26) relative to the horizontal reaction force to the cable 38 (and thus back to the spring structure 36 becomes very large. Thus even a small amount of force from the cable 38 is sufficient to provide a large lifting force on the MOC. This is very desirable because in a typical panel mounted MOC arrangement, as the MOC switch 22, 24 or 26 reaches its final position, the return spring force is also at its maximum value. With this large mechanical advantage, the amount of compression in the spring structure 36 on the prime mover lever/cam assembly to overcome return spring force is minimized so there is very little lost motion. In other words, the configuration of the toggle links 58, 60 can be such that nearly the full 50 mm of (unloaded) motion of the prime mover assembly can be utilized even when driving a fairly heavy MOC load, although most, if not all, of the final panel mounted MOC load is accommodated by the pre-load designed into the spring structure 36.

The primary interlocking requirements of a circuit breaker are also integral to the assembly. These requirements are such that a closed breaker cannot be moved into or out of the connected position and that if the breaker is not in any of the defined disconnect, test or connect positions, it may not be closed. As shown in FIG. 2, an interlock lever 31 is connected to a cable 33 which is indirectly connected to linkage 35 in the lower portion of the breaker 10. The lever 31 is rotated clockwise by linkage 35 and cable 33 when the circuit breaker 10 is being moved ("racked") to or from the connected position (FIG. 3). It is apparent by comparing FIGS. 3 and 4 that this can only be accomplished when the cam 30 is in the open position as illustrated in FIG. 3. With the contacts 14 in the closed position, the cam 30 is in the position illustrated in FIG. 4. This cam position prevents the motion of lever 31 and thus linkage 35 to prevent the racking of the circuit breaker 10 when the contacts 14 are closed. In a similar fashion, when the contacts 14 are in the open position, the position of the cam 30 is such that lever 31 can rotate. Should linkage 35 be positioned to allow for racking the circuit breaker, cable 33 rotates lever 31 as shown in FIG. 3, which blocks the rotation of cam 30 and the operating shaft 28 to prevent the contacts 14 of the breaker 10 from closing.

The MOC operator structure 12 and breaker panel interface 20 can be applied to retrofit, roll-in-placement (RIP) circuit breakers. A key feature of the MOC operator structure 12 and breaker panel interface 20 is that it is modular and can be applied to any configuration with similar requirements.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A mechanism-operated cell (MOC) operator structure for a vacuum circuit breaker, the circuit breaker including an operating shaft coupled to an operating mechanism that closes contacts of the circuit breaker, the MOC operator structure comprising:
   a cam constructed and arranged to be coupled to the operating shaft of the circuit breaker,
   a follower in engagement with the cam,
   a first lever coupled with the follower,
   free-floating spring structure associated with the first lever,
   a second lever,
   a linkage structure coupled with the second lever and constructed and arranged to be associated with a breaker-panel interface for moving auxiliary switches, and
   a movable cable structure operatively coupled between the first and second levers,
   wherein the first lever and spring structure are constructed and arranged such that when the contacts are closed, movement of the cam via the operating shaft drives the first lever to a maximum position compressing the spring structure, prior to any movement of the cable structure, and wherein force of the spring structure moves the cable structure and thus the second lever, causing movement of the linkage structure.

2. The MOC operator structure of claim 1, wherein the spring structure comprises a first compression spring having a certain spring rate and a second compression spring having a spring rate greater than the certain spring rate so that upon compression, the first spring is pre-loaded to provide the force to move the cable structure.

3. The MOC operator structure of claim 2, wherein a pivot block is engaged between the first and second springs, with an end of the first lever being coupled to the pivot block.

4. The MOC operator structure of claim 3, further comprising a bracket housing the first and second springs.

5. The MOC operator structure of claim 4, further comprising a rod coupled at one end to the bracket and coupled an another end to the cable structure, the rod being disposed internally of the first and second springs.

6. The MOC operator structure of claim 1, wherein the cable structure is a Bowden cable.

7. The MOC operator structure of claim 1, wherein the linkage structure comprises a rotatable shaft coupled to the second lever, a first link fixed to the rotatable shaft, and a second link pivotally coupled with the first link to define toggle link structure, the second link being constructed and arranged to be coupled to the breaker-panel interface.

8. The MOC operator structure of claim 1, further comprising an interlock lever associated with the cam and constructed and arranged to be coupled to a linkage of the circuit breaker such that the open or closed condition of the contacts of the breaker prevents movement of the interlock lever and thus movement of the linkage preventing breaker racking.

9. The MOC operator structure of claim 8, wherein the interlock lever is constructed and arranged to provide a physical blocking of the circuit breaker closing mechanism.

10. The MOC operator structure of claim 1, in combination with a vacuum circuit breaker.

11. A method of moving a breaker panel interface structure of a vacuum circuit breaker, the circuit breaker including an operating shaft coupled to an operating mechanism that closes contacts of the circuit breaker, the method comprising the step of:
   providing a mechanism-operated cell (MOC) operator structure having a cam coupled to the operating shaft of the circuit breaker, a follower in engagement with the cam, a first lever coupled with the follower, a free-floating spring structure associated with the first lever, a second lever, linkage structure coupled with the second lever and associated with the breaker-panel interface for moving auxiliary switches, and a link coupling the first lever to the second lever such that movement of the first lever moves the second lever, and
   ensuring that the first lever and spring structure are constructed and arranged such that when the contacts are closed, movement of the cam via the operating shaft drives the first lever to a maximum position compressing the spring structure, prior to any movement of second lever, and ensuring that force of the spring structure acts on the link to cause movement of the second lever, thereby causing movement of the linkage structure for moving the auxiliary switches.

12. The method of claim 11, wherein the spring structure is provided as a first compression spring having a certain spring rate and a second compression spring having a spring rate greater than the certain spring rate so that upon compression, the first spring is pre-loaded to provide the force to move the cable structure.

13. The method of claim 12, wherein a pivot block is engaged between the first and second springs, with an end of the first lever being coupled to the pivot block.

14. The method of claim 13, further providing a bracket housing the first and second springs.

15. The method of claim 11, wherein the link is provided as a Bowden cable.

16. The method of claim 11, further comprising an interlock lever associated with the cam and coupled to a linkage of the circuit breaker such that the open or closed condition of the contacts of the breaker prevents movement of the interlock lever and thus movement of the linkage preventing breaker racking.

17. The MOC operator structure of claim 16, wherein, the interlock lever physically blocks the circuit breaker closing mechanism.

* * * * *